US008323458B2

(12) United States Patent
O'Connor et al.

(10) Patent No.: US 8,323,458 B2
(45) Date of Patent: Dec. 4, 2012

(54) ELECTRO-MAGNETIC TREATMENT OF A MODIFIED BIOMASS

(75) Inventors: Paul O'Connor, Hoevelaken (NL); Dennis Stamires, Dana Point, CA (US)

(73) Assignee: KiOR, Inc., Pasadena, TX (US)

( * ) Notice: Subject to any disclaimer, the term of this patent is extended or adjusted under 35 U.S.C. 154(b) by 193 days.

(21) Appl. No.: 12/373,745

(22) PCT Filed: Jul. 13, 2007

(86) PCT No.: PCT/EP2007/057273
§ 371 (c)(1), (2), (4) Date: Jan. 14, 2009

(87) PCT Pub. No.: WO2008/009644
PCT Pub. Date: Jan. 24, 2008

(65) Prior Publication Data
US 2009/0314627 A1 Dec. 24, 2009

Related U.S. Application Data

(60) Provisional application No. 60/831,219, filed on Jul. 17, 2006.

(51) Int. Cl.
*B01J 19/12* (2006.01)
(52) U.S. Cl. ......... 204/157.6; 204/157.15; 204/157.61; 204/157.62; 204/157.63; 204/157.65; 208/402; 208/430; 208/432; 44/300
(58) Field of Classification Search ............. 204/157.15, 204/157.6, 157.61–157.63, 157.65, 158.2–158.21; 208/402, 430, 432; 44/300
See application file for complete search history.

(56) References Cited

U.S. PATENT DOCUMENTS

| 2,383,601 A | * | 8/1945 | Keim ............................ 554/167 |
| 5,417,824 A | * | 5/1995 | Greenbaum ............ 204/157.15 |
| 6,712,867 B1 | | 3/2004 | Boocock |
| 2003/0054500 A1 | * | 3/2003 | Ingram et al. ................... 435/99 |
| 2004/0074759 A1 | * | 4/2004 | Purta et al. ............. 204/157.15 |
| 2004/0074760 A1 | | 4/2004 | Portnoff et al. |
| 2005/0274065 A1 | * | 12/2005 | Portnoff et al. ................. 44/605 |
| 2006/0053515 A1 | * | 3/2006 | Geigenberger et al. ........ 800/288 |
| 2006/0252950 A1 | * | 11/2006 | Ginosar et al. ................ 554/174 |

FOREIGN PATENT DOCUMENTS

| DE | 3937331 A1 | 7/1990 |
| EP | 1256565 A | 11/2002 |
| EP | 1849854 A | 10/2007 |
| WO | 03014272 A | 2/2003 |
| WO | WO 03/014272 A2 * | 2/2003 |
| WO | WO 2004/057946 * | 7/2004 |

OTHER PUBLICATIONS http://webbook.nist.gov/cgi/cbook.cgi?ID=C67561&Units=SI&Mask=4#Thermo-Phase.*
Johnston, J.H. et al. (1987). Clays and Clay Minerals, 35(3), 170-176.*
Bamgboye, A.I. et al. (2008). International Agrophysics, 22, 21-29.*
Zhu, S. et al. (2006). Process Biochemistry, 41, 869-873.*
Montanes, F. et al. (2009) "Solubility of Carbohydrates in Subcritical Water" in Proceedings of the 9th International Symposium on Supercritical Fluids (ISSF 2009), May 18-20, 2009, Arcachon, France, 143-149.*

* cited by examiner

*Primary Examiner* — Brian McCaig
(74) *Attorney, Agent, or Firm* — Hovey Williams LLP

(57) ABSTRACT

A process is disclosed for making a biomass susceptible to depolymerization or liquefaction under mild conditions. The process comprises introducing into the biomass a material susceptible to the absorption of electro-magnetic radiation to form a radiation absorbent biomass. The radiation absorbent biomass is subjected to electro-magnetic radiation to form an activated biomass.

44 Claims, No Drawings

ELECTRO-MAGNETIC TREATMENT OF A MODIFIED BIOMASS

CROSS REFERENCE TO RELATED APPLICATIONS

This application is the national stage entry of Application No. PCT/EP 2007/057273, filed Jul. 13, 2007, which claims priority to U.S. Provisional Application Ser. No. 60/831,219, filed Jul. 17, 2006.

BACKGROUND OF THE INVENTION

1. Field of the Invention

The present invention relates to a process for the treatment of a modified biomass stream. The treatment results in a sensitized or activated material that is susceptible to subsequent conversion of the biomass to a gas, liquid fuel and/or chemicals under mild conditions.

The modification of biomass, which is necessary to make the biomass susceptible to an electro-magnetic field can be achieved by genetically modifying the biomass or by contacting the biomass with solution comprising nano-particles of preferably electromagnetic material(s).

A separate embodiment of this invention is that the biomass is converted into specific building block chemicals which can be utilized to produce liquid fuels or specialty chemicals and/or polymers.

2. Description of the Related Art

As the supplies of readily accessible crude oil are dwindling, there is an increasing need for liquid fuels from other sources. Certain carbon-based energy carrier materials are abundantly available. Examples include coal, tar sand, shale oil, and biomass. Processes have been developed to convert these energy carrier materials to liquid fuels. Examples of such processes include pyrolysis and hydrothermal conversion. However, these processes require relatively severe conditions, which adversely affect the quality of the products. There is, therefore, a need for developing carbon-based energy carrier materials such as biomass that are sensitized ('activated'), so as to be more susceptible to conversion to a liquid fuel and/or chemicals under relatively mild conditions.

BRIEF SUMMARY OF THE INVENTION

The present invention relates to a process for making biomass susceptible to liquefaction or depolymerization under mild conditions, said process comprising the steps of:
a) introducing into the biomass a material susceptible to the absorption of electromagnetic radiation to form a radiation absorbent biomass;
b) subjecting the radiation absorbent biomass to electromagnetic radiation to form an activated biomass.

DESCRIPTION OF ILLUSTRATIVE EMBODIMENTS

The following is a description of certain embodiments of the invention, given by way of example only.

Chemical reactions in general require that the molecules involved pass an energetic hurdle, known as the activation energy. Accordingly, chemical reactions requiring a high activation energy tend to proceed slowly, as only a small fraction of the molecules present in the reaction mixture possess the required activation energy. For the same reason, chemical reactions proceed more quickly as the temperature of the reaction increases, because at higher temperatures the fraction of the molecules possessing the required activation energy increases.

Catalysis can be defined as an interaction with reacting molecules that results in a lowering of the activation energy. Heterogeneous catalysis works by perturbing the electronic structure and properties of molecules by adsorption of these molecules to surface sites. Unfortunately, certain sites cannot be reached by bulky molecules.

An alternative is to selectively activate the chemical bonds within a molecule that are involved in the chemical reaction. This may be done by "marking" sites within a molecule with a marker (e.g. $K^+ \rightarrow C=O$), and then using electric and/or magnetic energy to activate these marked sites.

In its broadest aspect, the present invention relates to a process for making biomass susceptible to liquefaction or depolymerization under mild conditions, said process comprising the steps of:
a) introducing into the biomass a material susceptible to the absorption of electromagnetic radiation to form a radiation absorbent biomass;
b) subjecting the radiation absorbent biomass to electromagnetic radiation to form an activated biomass.

The term "electro-magnetic radiation" as used herein encompasses radiation made up of oscillating electric and magnetic fields. The term includes radar and radio waves, microwaves, AC heating, and oscillating magnetic fields.

The selection of the material susceptible to the absorption of electro-magnetic radiation depends on the type of electro-magnetic radiation to be used. The most suitable forms of radiation include radar waves, and oscillating magnetic fields having a frequency in the range of 1 kHz to 5 MHz.

Materials susceptible to the absorption of electromagnetic radiation include metals, in particular transition metals. Non-noble transition metals are preferred, because of their cost. Suitable metals include Fe, Mn, Zn, Rare-Earths. Particularly preferred is Fe.

The desired metal may be introduced into the biomass by dissolving a soluble compound in a suitable solvent, and impregnating the biomass with the solution. The term "impregnating" as used herein encompasses any process whereby the metal is allowed to diffuse into the biomass, and includes techniques such as soaking, incipient wetness impregnation, and the like.

Preferably the metal compound is water soluble, and water is used as the solvent.

In a preferred embodiment the metal is introduced into the biomass by the plant itself from which the biomass is derived. This process comprises the step of genetically engineering a plant so that it incorporates the radiation susceptible material into its polymer structure. Biomass produced from such a bioengineered plant automatically comprises the radiation susceptible material.

Preferred for use in the process of the present invention is biomass of photosynthetic origin. Particularly preferred is biomass comprising cellulose and/or ligno-cellulose. It is believed that metal impregnated into a biomass comprising (ligno-)cellulose is preferentially located near the beta-1 bonds of (ligno-)cellulose. When this radiation-absorbent biomass is subjected to electro-magnetic radiation the beta-1 bonds will become selectively activated. As the beta-1 bonds provide the links between the glucopyranose units of (ligno-)cellulose, activation of these bonds leads to depolymerization of the (ligno-)cellulose. It should be understood that this invention is not bound by this theory.

In a preferred embodiment, the electro-magnetic radiation used for activating the radiation absorbent biomass has a frequency in the microwave range. Preferably the frequency is in the range of 300 MHz to 300 GHz, more preferably from 1 GHz to 100 GHz. The technology for generating this type of radiation is well developed, as this radiation is widely used in applications such as radar and microwave ovens. The so-called magnetron used for generating microwave radiation can be designed to have an efficiency of 65% or higher.

In an alternate embodiment the material susceptible to the absorption of electro-magnetic radiation comprises nanoparticles of a magnetic material, and the electro-magnetic radiation comprises an oscillating magnetic field. The magnetic material suitably is a paramagnetic material, a ferromagnetic material, or a superparamagnetic material. Examples of ferromagnetic materials include metallic Co, metallic Fe, and $Fe_3O_4$ ($=FeO.Fe_2O_3$). Superparamagnetic materials are (ferro)magnetic materials of a very small particle size. Due to the small particle size, the energy required for a change in direction of the magnetic moment of the particle is near the ambient thermal energy. As a result the particles randomly reverse direction at a significant rate.

Magnetic particles may be introduced into the biomass via wet (impregnation, soaking or coating) and/or dry contacting (mixing, milling, grinding, fluidizing, fluidized grinding of the particles with the biomass. In this way the magnetic particles may be coated on the surface of the biomass particles or may even penetrate into the biomass particles.

The term "impregnating" as used herein encompasses any process whereby the metal is allowed to diffuse into the biomass or adsorbed onto the biomass, and includes techniques such as soaking, incipient wetness impregnation, and the like.

When biomass that has been made susceptible to magnetic fields is subjected to a high frequency oscillating magnetic field, the magnetic particles within the biomass produce an oscillating motion. This results in a localized heating of the biomass, whereby chemical bonds within the biomass become activated.

Once activated, the biomass may be liquefied or depolymerized under relatively mild conditions. The term "mild conditions" as used herein refers to temperatures in the range of from 20 to 500° C. and a pressure of from 1 to 50 bar. In a preferred embodiment the mild conditions comprise a temperature in the range of from ambient temperature to 350° C. and a pressure in the range of from 1 to 25 bar.

Depending on the desired products, the mild conditions under which said activated biomass is subjected may comprise hydrothermal conversion conditions, mild pyrolysis conditions, mild hydrolysis conditions, mild hydro-conversion, hydro-cracking, or hydro-treating conditions, catalytic cracking or enzymatic conversion conditions.

In an alternate embodiment, the starting material is a bioliquid as may be obtained in the pyrolysis or thermal conversion of a biomass material or of an activated biomass material.

Thus, in this embodiment the invention relates to a process for making bioliquid susceptible to depolymerization under mild conditions, said process comprising the steps of:
 a) introducing into the bioliquid a material susceptible to the absorption of electro-magnetic radiation to form a radiation absorbent bioliquid;
 b) subjecting the radiation absorbent bioliquid to electromagnetic radiation to form an activated bioliquid.

Using a bioliquid as the starting material offers the advantage that the step of introducing into the bioliquid a material susceptible to the absorption of electro-magnetic radiation may be carried out by mixing the bioliquid with a liquid source of the susceptible to the absorption of electromagnetic radiation. This liquid source may be a solution or, for example in the case of magnetic particles, a suspension.

Subsequent radiation converts the bioliquid to an activated bioliquid, which may be converted to useful fuels or specialty chemicals by reaction under relatively mild conditions.

In a specific embodiment the radiation absorbent biomass is subjected to electromagnetic radiation in a continuous process. For example, the radiation absorbent biomass may be conveyed on a continuous belt through a zone where a suitable form of electromagnetic radiation is being generated. This zone may be a continuous radiation reactor, or a portion of such a reactor.

The activated biomass may be further converted to liquid and/or gaseous products. This further conversion may be accomplished by known techniques such as pyrolysis or hydrothermal conversion, with the understanding that, due to the preceding activation, these techniques may be carried out under milder conditions than would be the case if no activation of the biomass had taken place.

The pyrolysis or hydrothermal conversion may take place in a separate process step, preferably immediately following the activation step. For example, the radiation absorbent biomass may be placed on a conveyor belt which travels through an electromagnetic radiation zone, and subsequently through a zone having the appropriate conditions for hydrothermal conversion or pyrolysis.

In an alternate embodiment, the activation step and the pyrolysis or hydrothermal conversion take place in one reactor. For example, a hydrothermal conversion reactor or a pyrolysis reactor may be equipped with a means for generating electromagnetic radiation. The reactor is fed with radiation absorbent biomass. The conditions in the reactor are brought to ranges appropriate for hydrothermal conversion or pyrolysis, respectively, while the biomass is subjected to electromagnetic radiation.

Thus, the invention has been described by reference to certain embodiments discussed above. It will be recognized that these embodiments are susceptible to various modifications and alternative forms well known to those of skill in the art.

Many modifications in addition to those described above may be made to the compositions and techniques described herein without departing from the spirit and scope of the invention. Accordingly, although specific embodiments have been described, these are examples only and are not limiting upon the scope of the invention.

EXAMPLES

Example 1

Wet Milling/Solid Additive

The biomass material (White Pine wood chips) is initially pulverized with a mechanical mixer for 5 min to reduce the particle size to about 5 mm. This wood material is wet milled [15 wt % slurry based on the dry weight (150° C.) of the wood] along with raw high iron-containing (Fe=40%) bauxite (bauxite to wood ratio of 5:100) in a planetary high energy mill (Pulverisette 6). The milled slurry is subjected to microwave radiation thereby activating the biomass material.

The following reference samples are prepared:
Wet milled wood/bauxite slurry described above without the microwave treatment.
Wet milled wood with microwave treatment.

Thermal decomposition of dried samples of the above slurries is performed using a Mettler-Toledo TGA/SDTA851e thermo balance. The samples (10-15 mg) are placed into an alumina cup (70 ml) and heated from 25 to 700° C. at a heating rate 5° C. min$^{-1}$ under Ar (Argon) flow (30 ml/min).

DTG curves are calculated from the corresponding weight versus temperature curve. Total weight loss is determined as difference between initial (at 25° C.) and remaining weight (at 600° C.) of the sample. In the case of the wood-bauxite mixture the total weight loss is determined by subtracting the amount of bauxite from the initial and remaining weight assuming that bauxite does not change during the experiment.

The microwave treated wood-bauxite sample shows higher weight loss than either of the reference samples, while the decomposition of this microwave treated wood-bauxite sample starts at a lower temperature than either of the reference materials.

After the microwave treatment, the milled wood-bauxite slurry is subjected to a hydrothermal treatment in an autoclave at 200° C. for two hours.

The products from this hydrothermal treatment result in two liquid phases, an aqueous phase containing soluble organic compounds, and a light hydrocarbon phase, along with some solid residue. The largest quantity of the light oil phase results from this microwave treated wood-bauxite material as compared to that of either of the reference materials.

Example 2

Wet Milling/solid Additive

Example 1 is repeated, except the bauxite is replaced with "red mud", which is the waste product from the Bayer process to produce alumina from bauxite. This waste product derives its name from its high oxidized iron content. It also contains titanium, sodium, silica and other impurities. Having been subjected to sodium hydroxide treatment during the Bayer process, it is highly caustic, with pH values in excess of 13.2.

The wood material is wet milled [15 wt % slurry based on the dry weight (150° C.) of the wood] along with "red mud" ("red mud" to wood ratio of 5:100) in a planetary high energy mill (Pulverisette 6). The milled slurry is subjected to microwave radiation thereby activating the biomass material.
The following reference samples are prepared:
Wet milled wood-"red mud" slurry described above without the microwave treatment.
Wet milled wood with microwave treatment.

Thermal decomposition of dried samples of the above slurries is performed using a Mettler-Toledo TGA/SDTA851e thermo balance. The samples (10-15 mg) are placed into an alumina cup (70 ml) and heated from 25 to 700° C. at a heating rate 5° C. min$^{-1}$ under Ar (Argon) flow (30 ml/min).

DTG curves are calculated from the corresponding weight versus temperature curve. Total weight loss is determined as difference between initial (at 25° C.) and remaining weight (at 600° C.) of the sample. In the case of the wood-"red mud" mixture the total weight loss is determined by subtracting the amount of "red mud" from the initial and remaining weight assuming that "red mud" is not changed during the experiment.

The microwave treated wood-"red mud" sample shows higher weight loss than either of the reference samples, while the decomposition of this microwave treated wood-"red mud" sample starts at a lower temperature than either of the reference materials.

After the microwave treatment, the milled wood-"red mud" slurry is subjected to a hydrothermal treatment in an autoclave at 200° C. for two hours.

The products from this hydrothermal treatment results in two liquid phases, an aqueous phase containing soluble organic compounds and light hydrocarbon phase, along with some solid residue. The largest quantity of the light oil phase result from this microwave treated wood-"red mud" material compared to what is observed for either of the reference materials.

Example 3

Wet Milling/Soluble Additive

Example 1 is repeated, except the bauxite is replaced by ferric sulfate.

The wood material is wet milled [15 wt % slurry based on the dry weight (150° C.) of the wood] along with ferric sulfate (ferric sulfate to wood ratio of 5:100) in a planetary high energy mill (Pulverisette 6). The milled slurry is subjected to microwave radiation thereby activating the biomass material.
The following reference samples are prepared:
Wet milled wood/ferric sulfate slurry described above without the microwave treatment.
Wet milled wood with microwave treatment.

Thermal decomposition of dried samples of the above slurries is performed using a Mettler-Toledo TGA/SDTA851e thermo balance. The samples (10-15 mg) are placed into an alumina cup (70 ml) and heated from 25 to 700° C. at a heating rate 5° C. min$^{-1}$ under Ar (Argon) flow (30 ml/min).

DTG curves are calculated from the corresponding weight versus temperature curve. Total weight loss is determined as the difference between initial (at 25° C.) and remaining weight (at 600° C.) of the sample. In the case of the wood-ferric sulfate mixture the total weight loss is determined by subtracting the amount of ferric sulfate from the initial and remaining weight assuming that ferric sulfate is not changed during the experiment.

The microwave treated wood-ferric sulfate sample shows higher weight loss than either of the reference samples, while the decomposition of this microwave treated wood-ferric sulfate sample starts at a lower temperature than either of the reference materials.

After the microwave treatment, the milled wood-ferric sulfate slurry is subjected to a hydrothermal treatment in an autoclave at 200° C. for two hours.

The products from this hydrothermal treatment result in two liquid phases, an aqueous phase containing soluble organic compounds and light hydrocarbon phase, along with some solid residue. The largest quantity of the light oil phase result from this microwave treated wood-ferric sulfate material than is observed for either of the reference materials.

Example 4

Wet Milling/Solid Additive

Example 1 is repeated, except the bauxite is replaced with Bastnasite, a rare earth carbonate mineral composed of mainly cerium and lanthanum, along with smaller amounts of other rare earths.

The wood material is wet milled [15 wt % slurry based on the dry weight (150° C.) of the wood] along with bastnasite (bastnasite to wood ratio of 5:100) in a planetary high energy mill (Pulverisette 6). The milled slurry is subjected to microwave radiation thereby activating the biomass material.
The following reference samples are prepared:
Wet milled wood/bastnasite slurry described above without the microwave treatment.

Wet milled wood with microwave treatment.

Thermal decomposition of dried samples of the above slurries is performed using a Mettler-Toledo TGA/SDTA851e thermo balance. The samples (10-15 mg) are placed into alumina cup (70 ml) and heated from 25 to 700° C. at a heating rate 5° C. $min^{-1}$ under Ar (Argon) flow (30 ml/min).

DTG curves are calculated from the corresponding weight versus temperature curve. Total weight loss is determined as difference between initial (at 25° C.) and remaining weight (at 600° C.) of the sample. In the case of the wood-bastnasite mixture the total weight loss is determined by subtracting the amount of bastnasite from the initial and remaining weight assuming that the bastnasite is not changed during the experiment.

The microwave treated wood-bastnasite sample shows higher weight loss than either of the reference samples, while the decomposition of this microwave treated wood-bastnasite sample starts at a lower temperature than either of the reference materials.

After the microwave treatment, the milled wood-bastnasite slurry is subjected to a hydrothermal treatment in an autoclave at 200° C. for two hours.

The products from this hydrothermal treatment result in two liquid phases, an aqueous phase containing soluble organic compounds and light hydrocarbon phase, along with some solid residue. The largest quantity of the light oil phase results from this microwave treated wood-bastnasite material as compared to what is observed for either of the reference materials.

Example 5

Wet milling/Soluble Additive

Example 3 is repeated, except the wood is replaced by another biomass material, corn stover. The corn stover material is wet milled [15 wt % slurry based on the dry weight (150° C.) of the corn stover] along with ferric sulfate (ferric sulfate to corn stover ratio of 5:100) in a planetary high energy mill (Pulverisette 6). The milled slurry is subjected to microwave radiation thereby activating the biomass material.

The following reference samples are prepared:
Wet milled corn stover/ferric sulfate slurry described above without the microwave treatment.
Wet milled corn stover with microwave treatment.

Thermal decomposition of dried samples of the above slurries is performed using a Mettler-Toledo TGA/SDTA851e thermo balance. The samples (10-15 mg) are placed into alumina cup (70 ml) and heated from 25 to 700° C. at a heating rate 5° C. $min^{-1}$ under Ar (Argon) flow (30 ml/min).

DTG curves are calculated from the corresponding weight versus temperature curve. Total weight loss is determined as difference between initial (at 25° C.) and remaining weight (at 600° C.) of the sample. In the case of the corn stover-ferric sulfate mixture the total weight loss is determined by subtracting the amount of ferric sulfate from the initial and remaining weight assuming that ferric sulfate is not changed during the experiment.

The microwave treated corn stover-ferric sulfate sample shows higher weight loss than either of the reference samples, while the decomposition of this microwave treated corn stover-ferric sulfate sample starts at a lower temperature than either of the reference materials.

After the microwave treatment, the milled corn stover-ferric sulfate slurry is subjected to a hydrothermal treatment in an autoclave at 200° C. for two hours.

The products from this hydrothermal treatment result in two liquid phases, an aqueous phase containing soluble organic compounds and light hydrocarbon phase, along with some solid residue. The largest quantity of the light oil phase results from this microwave treated corn stover-ferric sulfate material as compared to what is observed for either of the reference materials.

Example 6

Dry Milling/Solid Additive

The biomass material (White Pine wood chips) is initially pulverized with mechanical mixer for 5 min to reduce the particle size to about 5 mm. This wood material is dry milled along with raw high iron-containing (Fe=40%) bauxite powder (bauxite to wood ratio of 5:100) in a planetary high energy mill (Pulverisette 6). The resulting dry milled mixture is slurried and subjected to microwave radiation thereby activating the biomass material.

The following reference samples are prepared:
Dry milled wood/bauxite slurry described above without the microwave treatment.
Dry milled wood with microwave treatment.

Using the thermal decomposition method described in Example 1 above, the weight loss for the microwave treated dry milled wood-bauxite sample is higher than either of the reference samples, while the decomposition of the microwave treated dry milled wood-bauxite sample starts at a lower temperature than either of the reference materials.

After the microwave treatment, the dry milled wood-bauxite powder is subjected to a hydrothermal treatment in an autoclave at 200° C. for two hours.

The products from this hydrothermal treatment result in two liquid phases, an aqueous phase containing soluble organic compounds and light hydrocarbon phase, along with some solid residue. The largest quantity of the light oil phase results from this microwave treated wood-bauxite material as compared to what is observed for either of the reference materials.

Example 7

Impregnation

Wood particles impregnated with ferric sulfate solution are subjected to microwave radiation thereby activation the biomass material.

The following reference samples are prepared:
Ferric sulfate impregnated wood particles described above without the microwave treatment.
Wood with microwave treatment.

Using the thermal decomposition method described in Example 1 above, the weight loss for the microwave treated ferric sulfate impregnated wood sample is higher than either of the reference samples, while the decomposition of the microwave treated ferric sulfate impregnated wood sample starts at a lower temperature than either of the reference materials.

After the microwave treatment, the ferric sulfate impregnated wood sample is slurried and subjected to a hydrothermal treatment in an autoclave at 200° C. for two hours.

The products from this hydrothermal treatment result in two liquid phases, an aqueous phase containing soluble organic compounds and light hydrocarbon phase, along with some solid residue. The largest quantity of the light oil phase results from this microwave treated ferric sulfate impregnated wood as compared to what is observed for either of the reference materials.

Example 8

Kneading

A suspension of bauxite in water (20% bauxite) is added along with White Pine wood chips (approximately ½-inch wide by ¹⁄₃₂-inch thick) obtained from a commercial sawmill to a Kneadermaster 5USG mixer. The mixer chamber is jacketed having two horizontal, overlapping sigma blades, and is capable of operating up to 148° C. at a working pressure of 50 psig. Sufficient bauxite suspension is added to make a workable cake. The ratio of wood to bauxite is 85:15. The resulting cake is kneaded at a temperature of 150° C. for two hours. The kneaded cake is slurried and subjected to microwave radiation thereby activating the biomass material.

The following reference samples are prepared:
Kneaded wood/bauxite slurry described above without the microwave treatment.
Kneaded wood with microwave treatment.

Thermal decomposition of dried samples of the above slurries is performed using a Mettler-Toledo TGA/SDTA851e thermo balance. The samples (10-15 mg) are placed into alumina cup (70 ml) and heated from 25 to 700° C. at a heating rate 5° C. min$^{-1}$ under Ar (Argon) flow (30 ml/min).

DTG curves are calculated from the corresponding weight versus temperature curve. Total weight loss is determined as difference between initial (at 25° C.) and remaining weight (at 600° C.) of the sample. In the case of the kneaded wood-bauxite mixture the total weight loss is determined by subtracting the amount of bauxite from the initial and remaining weight assuming that bauxite is not changed during the experiment.

The microwave treated kneaded wood-bauxite sample shows higher weight loss than either of the reference samples, while the decomposition of this microwave treated kneaded wood-bauxite sample starts at a lower temperature than either of the reference materials.

After the microwave treatment, the kneaded wood-bauxite is subjected to a hydrothermal treatment in an autoclave at 200° C. for two hours.

The products from this hydrothermal treatment result in two liquid phases, an aqueous phase containing soluble organic compounds and light hydrocarbon phase, along with some solid residue. The largest quantity of the light oil phase results from this microwave treated kneaded wood-bauxite material as compared to what is observed for either of the reference materials.

Example 9

Kneading

Example 8 is repeated, except the bauxite is replaced with "red mud". The following reference samples are prepared:
Kneaded wood/"red mud" slurry described in above without the microwave treatment.
Kneaded wood with microwave treatment.

Using the thermal decomposition method described in Example 1 above, the weight loss for the microwave treated kneaded wood-"red mud" sample is higher than either of the reference samples, while the decomposition of the microwave treated kneaded wood-"red mud" sample starts at a lower temperature than either of the reference materials.

After the microwave treatment, the kneaded wood-"red mud" sample is subjected to a hydrothermal treatment in an autoclave at 200° C. for two hours.

The products from this hydrothermal treatment result in two liquid phases, an aqueous phase containing soluble organic compounds and light hydrocarbon phase, along with some solid residue. The largest quantity of the light oil phase results from this microwave kneaded wood-"red mud" material as compared to what is observed for either of the reference materials.

What is claimed is:

1. A process for converting biomass to gas, liquid fuels, and/or chemicals under mild conditions, said process comprising the steps of:
   a) introducing into the biomass a material susceptible to the absorption of electro-magnetic radiation to form a radiation absorbent biomass;
   b) subjecting the radiation absorbent biomass to electro-magnetic radiation to form an activated biomass; and
   c) subsequent to step b), converting the activated biomass at a temperature in the range from 150 to 500° C. and a pressure of from 1 to 50 bar into a conversion product comprising water and one or more of gas, liquid fuels, and chemicals,
   wherein the biomass comprises ligno-cellulose.

2. The process of claim 1 wherein the material susceptible to the absorption of electromagnetic radiation comprises a transition metal.

3. The process of claim 2 wherein the transition metal is a non-noble transition metal.

4. The process of claim 3 wherein the non-noble transition metal is selected from the group consisting of Fe, Mn, Zn, Cu, Ni, and mixtures thereof.

5. The process of claim 4 wherein the non-noble transition metal comprises Fe.

6. The process of claim 1 wherein the material susceptible to the absorption of electro-magnetic radiation is introduced into the biomass by impregnating the biomass with a solution of a compound of said material.

7. The process of claim 1 wherein step a) comprises feeding plants with nutrients rich in radiation susceptible material so that the radiation susceptible material becomes incorporated into the polymer structure of the plants; and converting the plants to biomass material.

8. The process of claim 1 wherein the biomass is of photosynthetic origin.

9. The process of claim 1 wherein the electro-magnetic radiation has a frequency in the range of 300 MHz to 300 GHz.

10. The process of claim 1 wherein the electro-magnetic radiation has a frequency in the range of 1 GHz to 100 GHz.

11. The process of claim 1 wherein said converting of step (c) includes subjecting the activated biomass to liquefaction.

12. The process of claim 11, wherein the pressure is in the range of 1 to 25 bar.

13. The process of claim 1, wherein said converting of step (c) includes subjecting the activated biomass to hydrothermal conversion.

14. The process of claim 1, wherein said converting of step (c) includes subjecting the activated biomass to mild pyrolysis.

15. The process of claim 1, wherein said converting of step (c) includes subjecting the activated biomass to hydrolysis.

16. The process of claim 1, wherein said converting of step (c) includes subjecting the activated biomass to hydro-conversion, hydro-cracking or hydro-treating.

17. The process of claim 1, wherein said converting of step (c) includes subjecting the activated biomass to catalytic cracking.

18. A process according to claim 1, wherein step b) comprises a continuous process for converting radiation absorbent biomass to activated biomass comprising the step of conveying radiation absorbent biomass through a zone wherein electro-magnetic radiation is generated.

19. The process of claim 1, wherein said subjecting of step b) and said converting of step c) are carried out in separate reactors.

20. The process of claim 1, wherein said subjecting of step b) and said converting of step c) are carried out in the same reactor.

21. The process of claim 1, wherein the biomass comprises solid biomass particles.

22. The process of claim 1, wherein said subjecting of step b) lowers the activation energy required for said converting of step c).

23. The process of claim 1, wherein the material susceptible to the absorption of electro-magnetic radiation consists of one metal.

24. The process of claim 1, wherein the biomass comprises wood particles, wherein said converting of step c) comprises depolymerizing at least a portion of said ligno-cellulose.

25. The process of claim 1, wherein the conversion product comprises an aqueous phase and a hydrocarbon phase, wherein the aqueous phase comprises the water and soluble organic compounds.

26. A process for converting biomass to gas, liquid fuels, and/or chemicals under mild conditions, said process comprising the steps of:
   a) introducing into the biomass a material susceptible to the absorption of electro-magnetic radiation to form a radiation absorbent biomass;
   b) subjecting the radiation absorbent biomass to electro-magnetic radiation to form an activated biomass; and
   c) subsequent to step b), converting the activated biomass into a conversion product comprising water and one or more of gas, liquid fuels, and chemicals,
   wherein the material susceptible to the absorption of electromagnetic radiation comprises a Rare-Earth metal.

27. The process of claim 26, wherein said converting of step c) is carried out at a temperature in the range from 150 to 500° C. and a pressure in the range of 1 to 50 bar.

28. A process for converting biomass to liquid fuels and/or chemicals under mild conditions, said process comprising the steps of:
   a) introducing into the biomass a material susceptible to the absorption of electro-magnetic radiation to form a radiation absorbent biomass;
   b) subjecting the radiation absorbent biomass to electro-magnetic radiation to form an activated biomass; and
   c) subsequent to step b), converting the activated biomass at a temperature in the range from 150 to 500° C. and a pressure of from 1 to 50 bar into liquid fuels and/or chemicals, wherein the material susceptible to the absorption of electro-magnetic radiation is introduced into the biomass by impregnating the biomass with a solution of a compound of said material, wherein the solution is an aqueous solution.

29. A process for converting biomass to gas, liquid fuels, and/or chemicals under mild conditions, said process comprising the steps of:
   a) introducing into the biomass a material susceptible to the absorption of electro-magnetic radiation to form a radiation absorbent biomass;
   b) subjecting the radiation absorbent biomass to electro-magnetic radiation to form an activated biomass; and
   c) subsequent to step b), converting the activated biomass at a temperature in the range from 150 to 500° C. and a pressure of from 1 to 50 bar into a conversion product comprising water and one or more of gas, liquid fuels, and chemicals, wherein the material susceptible to the absorption of electro-magnetic radiation comprises nanoparticles of a magnetic material.

30. The process of claim 29 wherein the magnetic material is a paramagnetic material, a ferromagnetic material, or a superparamagnetic material.

31. The process of claim 29 wherein the magnetic material is an iron oxide.

32. The process of claim 29 wherein step b) comprises heating the biomass by subjecting the biomass to an AC magnetic field having a frequency in the range of 1 kHz to 5 MHz.

33. A process for converting biomass to gas, liquid fuels, and/or chemicals under mild conditions, said process comprising the steps of:
   a) introducing into the biomass a material susceptible to the absorption of electro-magnetic radiation to form a radiation absorbent biomass;
   b) subjecting the radiation absorbent biomass to electro-magnetic radiation to form an activated biomass; and
   c) hydrothermally converting the activated biomass into a conversion product comprising an aqueous phase and a hydrocarbon phase, wherein the aqueous phase comprises the water and soluble organic compounds, wherein said biomass comprises ligno-cellulose.

34. The process of claim 33, wherein said subjecting of step b) lowers the activation energy required for said hydrothermally converting of step c).

35. The process of claim 33, wherein said hydrothermally converting of step c) converts the activated biomass into a conversion product comprising water and one or more of gas, liquid fuels, and chemicals.

36. The process of claim 33, wherein said hydrothermally converting of step c) is carried out at a temperature in the range from ambient temperature to 350° C. and a pressure in the range of 1 to 25 bar.

37. The process of claim 33, wherein the biomass comprises wood particles, wherein said hydrothermally converting of step c) comprises depolymerizing at least a portion of said ligno-cellulose.

38. The process of claim 33, wherein said converting of step c) is carried out at a temperature in the range from 150 to 500° C. and a pressure in the range of 1 to 50 bar.

39. A process for converting wood particles comprising ligno-cellulose into gas, liquid fuels, and/or chemicals under mild conditions, said process comprising the steps of:
   a) introducing into the wood particles a material susceptible to the absorption of electro-magnetic radiation to form radiation absorbent wood particles;
   b) subjecting said radiation absorbent wood particles to electro-magnetic radiation in an electro-magnetic radiation zone to form activated wood particles; and
   c) subjecting the activated wood particles to conversion in a conversion zone separate from the electro-magnetic radiation zone to thereby depolymerize at least a portion of the ligno-cellulose, wherein the conversion converts the activated wood particles into a conversion product comprising an aqueous phase and a hydrocarbon phase, wherein the aqueous phase comprises the water and soluble organic compounds.

40. The process of claim 39, wherein said subjecting of step b) lowers the activation energy required for said converting of step c).

41. The process of claim 39, wherein the conversion product further comprises water.

42. The process of claim 39, wherein the material susceptible to the absorption of electro-magnetic radiation consists of one metal.

43. The process of claim 39, wherein said converting of step c) is carried out at a temperature in the range from ambient temperature to 350° C. and a pressure in the range of 1 to 25 bar.

44. The process of claim 39, wherein said converting of step c) is carried out at a temperature in the range from 150 to 500° C. and a pressure in the range of 1 to 50 bar.

* * * * *